March 19, 1968          R. J. HOLTON          3,373,645

REVERSIBLE SELF-THREADING NUT

Filed Dec. 10, 1965

INVENTOR.
ROBERT J. HOLTON
BY
*Jearl, Jearl & Sammon*
ATTORNEYS

United States Patent Office 3,373,645
Patented Mar. 19, 1968

3,373,645
REVERSIBLE SELF-THREADING NUT
Robert J. Holton, Rocky River, Ohio, assignor to Tinnerman Products, Inc., Cleveland, Ohio, a corporation of Ohio
Filed Dec. 10, 1965, Ser. No. 512,929
9 Claims. (Cl. 85—32)

ABSTRACT OF THE DISCLOSURE

A reversible, self-threading fastening device adapted for assembly with a threadless member including a body having an opening therethrough. The opening has a continuous axially extending surface having a plurality of projections which extend radially into the opening and are formed from the material of the body removed from recessed portions made in the axially extending surface. The projections are formed so that the upper and lower surfaces merge to form a linear edge which is adapted to cut into a threadless member and which edge terminates at its opposite ends in the axially extending surface.

---

This invention relates to fastening devices, and more particularly to an improved construction for a self-threading, washer-like fastening device for use in assembly with threadless members.

Heretofore, various types of non-threaded or threadless fastening devices have been employed for attachment to threadless (plain) members, such as bolts, studs or the like, for mounting two or more parts together. To be effective, such arrangements must combine the desirable properties of strength, rigidity and hardness in order to cut deep, uniform threads in the stud, particularly when it is made of tough, hard materials. Heretofore, devices have been proposed which generally include a stud-receiving opening having various thread-cutting arrangements, such as bent edges, inclined tongues or flexible finger elements, constructed and arranged to cut into the outer surface of the stud to form threads. Though suitable for some purposes, such heretofore known devices are not satisfactory in many applications, particularly where a device having a minimum thickness is required. Thus, such devices are not only bulky in construction, but do not combine the necessary strength, rigidity and hardness characteristics for uses which require a minimum thickness, such as when applied as a washer or the like.

More recently, it has been known to provide a washer-like construction having thread-cutting projections formed from the material of the body of the device. In such arrangement, the projections have a leading end portion and a trailing end portion constructed and arranged for cutting helical threads in only one direction. Thus, by such arrangement, the threadless member can be applied to only one side of the washer-like member, thereby effectively limiting its usability. In addition, such arrangement is difficult to install due to the improper orientation of the device during assembly with a threadless member. Improper orientation results in high destructive torque values, thereby resulting in shearing of the projections and/or damage to or actual destruction of the device.

Accordingly, an object of the present invention is to provide an improved construction for a self-threading, washer-like fastening device which overcomes the aforementioned and other related disadvantages of heretofore known fastening devices by the provision of a simple, yet rugged construction which may be reversibly self-threaded onto a threadless member for holding the parts in assembled relationship.

Another object of the present invention is to provide a fastening device of the character described which is inexpensive to produce, which may be properly oriented without cocking and/or misalignment thereof, and which provides improved uniform torque values in the assembled position.

Other objects and advantages of the invention will be apparent from the following description taken in conjunction with the accompanying drawings, wherein.

Figure 1:
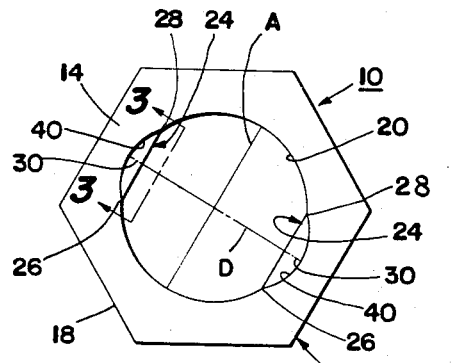
FIG. 1 is a top plan view of one form of the self-threading, washer-like fastening device made in accordance with the invention.
Figure 2:
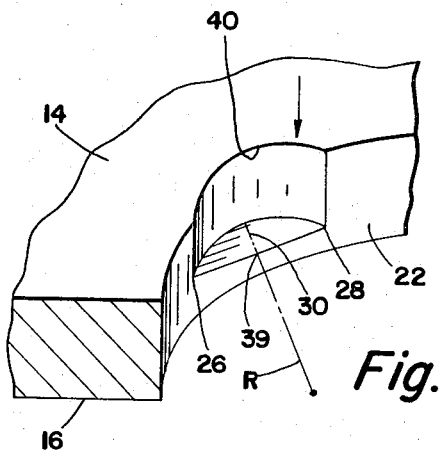
FIG. 2 is an enlarged fragmentary, generally perspective view of a portion of the device of FIG. 1.
Figure 7:
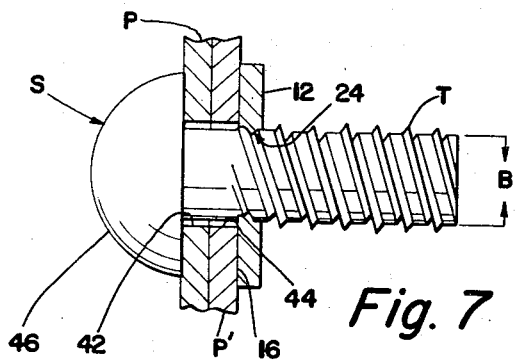
FIG. 7 is a fragmentary assembly view, partly in section, showing the fastening device of FIG. 1 mounted in self-threading engagement on a threadless member for securing a pair of support members together.

Referring again to the drawings, and in particular to FIGS. 1 and 7 thereof, the fastening device in one form of the invention, designated generally at 10, is shown mounted in self-threading engagement on a plain (threadless) member S, such as a stud or the like, for joining two or more apertured support members P and P' in juxtaposed engaged relationship.

In the embodiment shown, the device 10 includes a base or body 12 which may be conveniently made from a single blank or strip of sheet metal, such as steel. The body 12 preferably has a generally flat upper surface 14 and generally flat lower surface 16 which surfaces may extend generally parallel to one another. To conveniently install the device, the body 12 may be provided with a polygonal, such as hexagonal, outer peripheral edge 18 which provides a bearing surface for engagement by a suitable tool, such as a wrench or the like.

Figure 4:
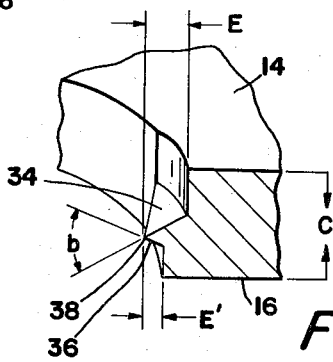
FIG. 4 is an enlarged fragmentary section view taken along the line 4—4 of FIG. 3.

The body 12 of the device is provided with a central opening 20 preferably spaced equidistant from the edge 18 which opening has a diameter A that is preferably slightly greater than the normal maximum diameter B of the threadless member S. The dimension B represents the maximum diameter of the threadless member S prior to the formation of threads T thereon, as best shown in FIG. 7. In the embodiment shown, the diameter A of the opening 20 is about ¼ inch with the thickness C (FIG. 4) of the body 12 being about 5/64 inch or in the ratio of about 3:1.

In accordance with the form shown in FIGS. 1 to 4, the interior edge surface 22 presented by the opening 20 is preferably provided with a plurality of self-threading means in the form of generally crescent-shaped projections 24 which are adapted for cutting uniform, helical threads T on the threadless member S. In the form shown, the projections 24 are two in number and are oppositely disposed in generally circumferentially spaced relation on the interior edge surface 22. It is to be understood, however, that any number of projections may be employed in accordance with the invention.

Figure 3:
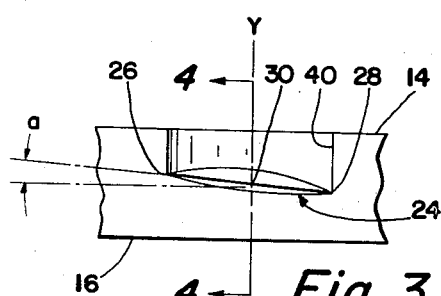
FIG. 3 is an enlarged fragmentary section view taken along the line 3—3 of FIG. 1.

As shown, each projection 24 preferably includes a leading end portion 26 which extends angularly toward another leading end portion 28, thereby to provide a pitch angle $a$ with respect to the rotational axis Y—Y of the device, as shown in FIG. 3. By this arrangement, it is seen that by a relative variation in the pitch angle, the relative coarseness or fineness of the threads may be provided on the threadless member S, as desired.

In accordance with the invention, each projection may include a thread-cutting portion, as represented by broken line at 30, which is disposed generally between the two leading end portions 26 and 28. Such thread-cutting portion 30 of each projection is preferably located adjacent the medial or center area thereof. In the embodiment shown, each projection preferably has a minimum depth adjacent the leading end portions 26 and 28, and a maximum depth adjacent the cutting portion 30, as measured normal to the rotational axis Y—Y of the device. Also, each projection preferably has a minimum thickness adjacent the leading end portions 26 and 28, and has a maximum thickness adjacent the cutting portion 30, as measured parallel to the rotational axis Y—Y of the device. By this arrangement, each projection has a maximum depth and thickness in the area adjacent its central thread cutting portion to provide, in effect, a trailing construction which conjunctively cooperates with either of the leading end portions 26 and 28 for cutting uniform threads in the threadless member S. Thus, each projection has a minimum depth and thickness adjacent the leading end portions 26 and 28 either of which conjunctively cooperates with the thread-cutting portion 30 to provide clearance areas to facilitate the initial starting of the device into self-threading engagement onto the end of the threadless member S. Accordingly, the maximum transverse dimension D between oppositely disposed projections 24 at diametrically opposed of the thread-cutting portions 30 is substantially less than the normal diameter B of the threadless member S so as to cut uniform, deep threads in the threadless member. In the embodiment shown, the diameter A of the opening 20 being about ¼ inch, the transverse dimension D is about %₃₂ inch, or in the ratio of about 1⅓ to 1.

In the embodiment shown, the leading end portions 26 and 28 of the respective projections 24 may be disposed so as to lie in the general surface of the interior annular edge 22 which defines the opening 20. The minimum transverse dimension between oppositely disposed of the projections at diametrically opposed of the leading end portions 26 and 28 is preferably equal to the diameter A of the opening 20. Moreover, the transverse dimension between the opposed projections at diametrically opposed of the leading end portions progressively decreases in a direction toward the thread-cutting portion 30 to provide the crescent-shaped construction shown. By this arrangement, the device may be readily reversibly applied to a threadless member and for assembly to either side of a support member, i.e. top or bottom sides, with improved, uniform torque values, thereby to reduce any expansive force on the device during installation thereof. It is to be understood, however, that other shapes of the projections, other than the crescent-shape shown, may be employed in accordance with the principles of the invention. Thus, any suitable shape may be employed which has a thread cutting portion disposed between leading end portions so that the device may be reversibly applied to a threadless member, as aforesaid.

The projections 24 in vertical cross-section (FIG. 4) are generally polygonal, such as triangular, in shape defined by an upper inclined surface 34 and a lower inclined surface 36 which extend convergently toward one another and merge at a crest or apex edge 38. In the embodiment shown, the edge 38 preferably extends generally linearly between the leading end portions 26 and 28 thereby providing, in effect, a chord of the opening 20, having its mid point 39 (FIG. 2) perpendicular to the radius R of the opening 20.

The projections in this form may be made by scoring the material of the annular edge 22 axially downwardly by means of a form tool, such as a broach, commencing at a plurality of circumferentially spaced points on the upper surface 14 of the body 12. The material removed by the scoring provides a corresponding number of recesses 40 which have, in top plan, a generally crescent-shaped contour. As the scoring continues, the material removed is caused to gather together and move radially inwardly adjacent the bottom of a respective recess, thereby to provide the crescent-shaped projection shown. Radially considered, and when scoring down from only one side of the body, the depth E of each projection adjacent the upper surface 34 is substantially greater than the depth E' of the projection adjacent its lower surface 36 so as to provide an included angle b therebetween. Thus, because the scoring is from only one side of the body, the included angle defined by the gathered material of the scoring is substantially less than the included angle of scored material where the scoring is achieved from both sides of the body, as will hereinafter be more fully described.

Figure 5:
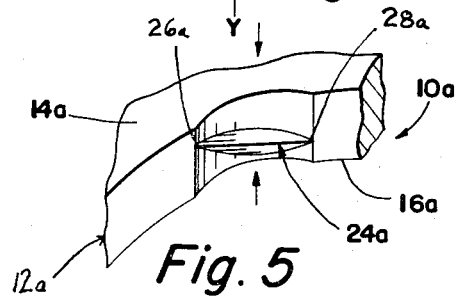
FIG. 5 is an enlarged fragmentary section view showing a modification of the fastening device made in accordance with the invention.
Figure 6:
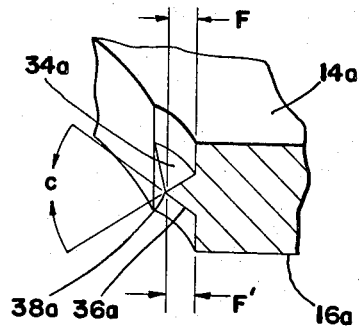
FIG. 6 is an enlarged fragmentary section view taken along the line 6—6 of FIG. 5.

In FIGS. 5 and 6, there is illustrated a modification of the fastening device, designated generally at 10a which is generally similar to that shown in FIGS. 1 to 4 with the suffix a added to the reference numerals to designate similar parts, except that in this form the projections 24a are provided by scoring the material of the body 12a axially inwardly from both the upper surface 14a and the lower surface 16a to provide the crescent-shaped construction shown.

As best shown in FIG. 6, the projections 24a similarly include an upper inclined surface 34a and the lower inclined surface 36a which extend convergently toward one another so as to merge at a crest or apex edge 38a which preferably extends generally linearly between the leading end portions 26a and 28a thereof. Radially considered in this form, however, the depth F of each respective projection adjacent the upper surface 34a is substantially equal to the depth F' adjacent the lower surface 36a so as to provide an included angle c which is substantially greater than the included angle b of the embodiment shown in FIGS. 1 to 4. Thus, by scoring the material of the body axially inwardly from both sides of the body 12a from circumferentially spaced points, a greater amount of material is gathered together to provide the respective projections, thereby to increase the strength characteristics of the projections for thread-cutting purposes, particularly, when the body is comprised of relatively thin material.

In application, the operation of the device illustrated in FIGS. 1 to 4 is generally similar to that illustrated in FIGS. 5 to 6 so that the following description of such operation will proceed with reference to the embodiments shown in FIGS. 1 to 4. Moreover, as shown in FIG. 7, the support members P and P' may be disposed in side-by-side relationship with the apertures 42 and 44 therein disposed in registration with one another so as to receive the threadless member S. Thus positioned, the device 10 may be inserted onto the end of the threadless member S and turned down in the direction toward the support member P' by means of a suitable tool (not shown) being brought into turning engagement with the outer edge surface 18. As the device 10 is being turned down, the projections 24 progressively cut into the threadless member S so as to displace material therefrom to form the uniform, helical threads T along its length. The device is turned down until the lower surface 16 is disposed in engagement with the confronting surface of the support member P', whereby the juxtaposed members P and P' are held in firm abutting engagement against one another and between the head portion 46 of the now threaded member S and the body 12 of the device.

From the foregoing description and accompanying drawings, it will be seen that the invention provides an improved construction of a self-threading, washer-like fastening device which may be readily and reversibly assembled from either side of a support member for self-threading engagement onto a threadless member, thereby to facilitate the application thereof in inaccessible or blind locations. The device may be quickly and easily reversibly applied to a threadless member irrespective of any improper orientation thereof prior to assembly onto the threadless member so as to prevent cocking or misalignment thereof. In addition, the device incorporates a novel thread-cutting construction which provides improved, uniform torque values in the assembled position thereof, thereby enabling relatively thin materials to be effectively employed in washer-like engagement with a threadless member for holding two or more parts in assembled relationship.

The terms and expressions which have been used, are terms of description and not of limitation and there is no intention in the use of such terms and expressions of excluding any equivalents of any of the features shown or described.

I claim:

1. A reversible, self-threading fastening device adapted for assembly with a threadless member comprising, a body having an opening adapted to receive said threadless member therethrough, a plurality of projections formed from the material of said body and extending radially inwardly into said opening, said projections each including a pair of spaced leading end portions and a thread-cutting portion disposed generally between said leading end portions, said opening is defined by an inner endless edge surface, said edge surface having a plurality of recessed portions of greater radial extent than said edge surface formed therein, each of said projections made integral with said body and providing a bottom for the respective of said recessed portions, said projections extending radially from and circumferentially across said recessed portions and the edge surface of each said projection including said thread cutting portion extending generally linearly from one leading end portion to the other leading end portion, said projections each having a minimum thickness adjacent said leading end portions and a maximum thickness adjacent said thread-cutting portion measured parallel with respect to the rotational axis of said device, said thread-cutting portion adapted to operably cut threads on said threadless member upon insertion of the latter into either side of the opening in said body.

2. A fastening device in accordance with claim 1, wherein said recess portions are disposed on one side of the respective of said projections.

3. A fastening device in accordance with claim 1, wherein the recess portions are disposed on opposite sides of the respective of said projections.

4. A fastening device in accordance with claim 1, wherein said projections each have a minimum depth adjacent said leading end portions and a maximum depth adjacent said thread cutting portion measured normal with respect to the rotational axis of said device.

5. A fastening device in accordance with claim 1, wherein said projections taper at an acute angle with respect to the rotational axis of said device from one of said leading end portions to the other of said leading end portions.

6. A fastening device in accordance with claim 1, wherein said opening is circular in shape, and wherein the midpoint of said edge surface is disposed generally normal with respect to the radius of said opening.

7. A fastening device in accordance with claim 1, wherein said body includes generally flat upper and lower side surfaces, said opening defined by an inner edge surface extending from said upper side surface to said lower side surface.

8. A fastening device in accordance with claim 7, wherein said recess portions extend axially inwardly from said upper side surface.

9. A fastening device in accordance with claim 7, wherein said recess portions extend axially inwardly from said upper side surface and said lower side surface, whereby the respective projections provide a bottom-like partition between said upper and lower side surfaces.

References Cited

UNITED STATES PATENTS

| 2,832,972 | 5/1958 | Richards | 85—32 |
| 2,896,495 | 7/1959 | Crawford | 85—32 |
| 2,983,180 | 5/1961 | Sygnator | 85—32 |
| 3,153,972 | 10/1964 | Holton | 85—36 |

FOREIGN PATENTS 568,809  4/1945  Great Britain.

OTHER REFERENCES

A.P.C. application of Stiegelmeyer, Ser. No. 299,160, published June 1, 1943, application was abandoned May 18, 1942, copy in 85–32 Int.

MARION PARSONS, JR., *Primary Examiner.*